(12) United States Patent
Thackwell et al.

(10) Patent No.: US 10,500,937 B2
(45) Date of Patent: Dec. 10, 2019

(54) ELECTRIC DRIVE UNIT, HYBRID DRIVE DEVICE, AND VEHICLE

(71) Applicant: VOLKSWAGEN AKTIENGESELLSCHAFT, Wolfsburg (DE)

(72) Inventors: Cleef Thackwell, Kassel (DE); Gerd Stoehr, Wesendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 376 days.

(21) Appl. No.: 15/532,119

(22) PCT Filed: Oct. 9, 2015

(86) PCT No.: PCT/EP2015/073472
§ 371 (c)(1),
(2) Date: Jun. 1, 2017

(87) PCT Pub. No.: WO2016/087101
PCT Pub. Date: Jun. 9, 2016

(65) Prior Publication Data
US 2017/0267092 A1    Sep. 21, 2017

(30) Foreign Application Priority Data

Dec. 1, 2014    (DE) .................. 10 2014 224 476

(51) Int. Cl.
*B60K 6/26*        (2007.10)
*H02K 3/28*        (2006.01)
(Continued)

(52) U.S. Cl.
CPC ................ *B60K 6/26* (2013.01); *B60K 6/365* (2013.01); *B60K 6/38* (2013.01); *B60K 6/48* (2013.01);
(Continued)

(58) Field of Classification Search
CPC .......... H02K 3/28; H02K 7/108; H02K 7/116; H02K 9/19; H02K 9/197; H02K 11/33;
(Continued)

(56) References Cited

U.S. PATENT DOCUMENTS

| 5,519,269 A | 5/1996 | Lindberg |
| 6,590,312 B1 | 7/2003 | Seguchi et al. |

(Continued)

FOREIGN PATENT DOCUMENTS

| CN | 203813597 U | 9/2014 |
| DE | 3640146 A1 | 6/1988 |

(Continued)

*Primary Examiner* — Ramon M Barrera
(74) *Attorney, Agent, or Firm* — Laurence A. Greenberg; Werner H. Stemer; Ralph E. Locher

(57) ABSTRACT

An electric drive unit for a hybrid drive, in particular for a vehicle, has an increased power output and degree of efficiency, while thermal loading as well as required installation space and manufacturing costs are minimized. The electric drive unit has an asynchronous machine with a rotor with a rotor cage, in particular a rotor cage which is formed with copper conductors. The asynchronous machine is formed with a stator having a shaft winding. The shaft winding is formed with a device for star-delta changeover. The rotor is formed with a rotor internal cooling device. A step-up gear mechanism is arranged in a power train between the rotor and the output element. There is also described a hybrid drive device with an electric drive unit, and a vehicle that has an electric drive unit and/or a hybrid drive device.

13 Claims, 5 Drawing Sheets

Figure 1:
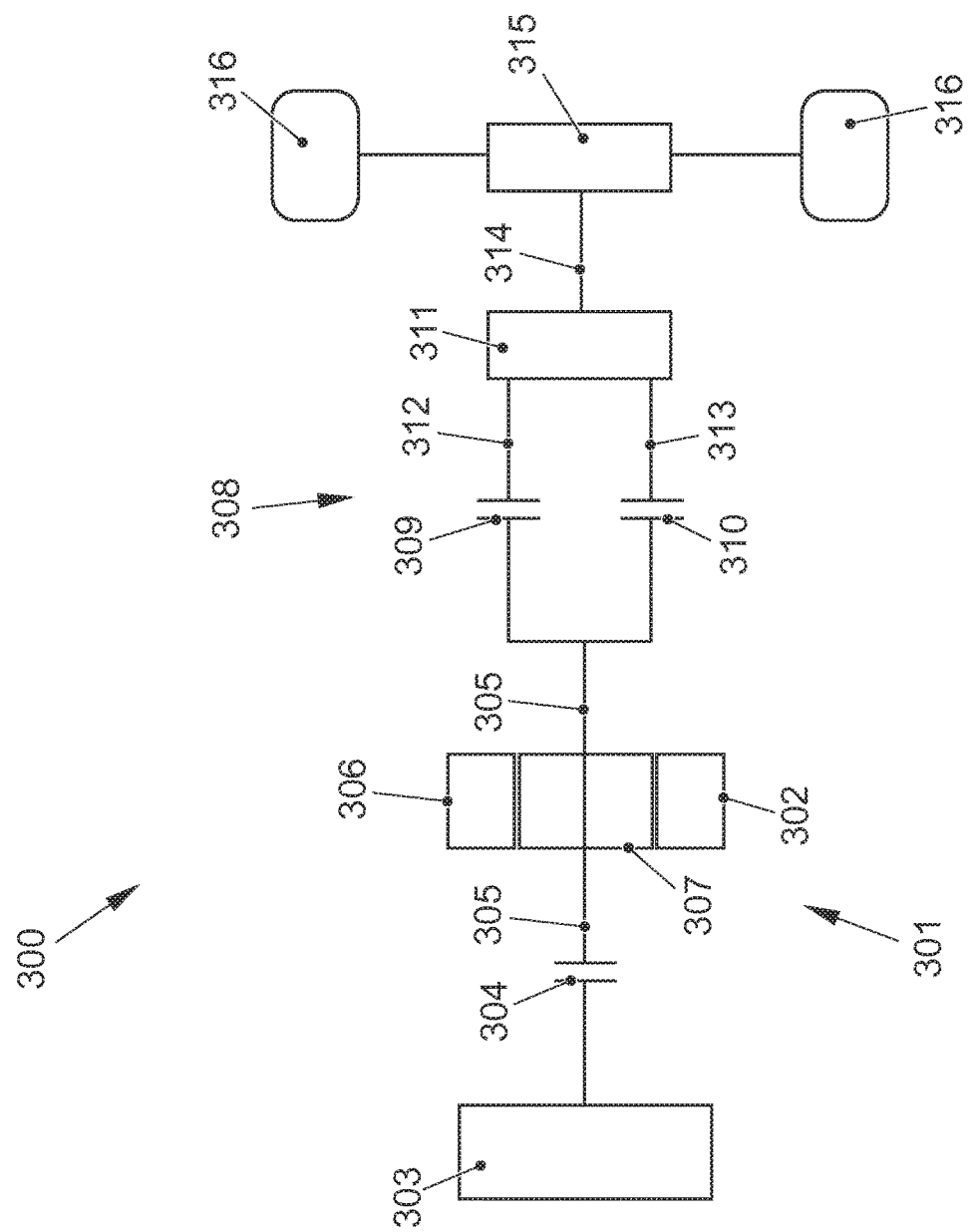

(51) Int. Cl.
*H02K 7/108* (2006.01)
*H02K 7/116* (2006.01)
*H02K 9/19* (2006.01)
*H02K 17/16* (2006.01)
*H02K 11/33* (2016.01)
*B60K 6/365* (2007.10)
*B60K 6/38* (2007.10)
*H02K 9/197* (2006.01)
*H02P 25/18* (2006.01)
*B60K 6/48* (2007.10)
*B60K 6/547* (2007.10)
*B60L 50/13* (2019.01)
*B60L 50/51* (2019.01)
*H02K 1/32* (2006.01)
*B60K 11/00* (2006.01)
*B60K 11/02* (2006.01)
*B60K 1/00* (2006.01)

(52) U.S. Cl.
CPC .............. *B60K 6/547* (2013.01); *B60L 50/13* (2019.02); *B60L 50/51* (2019.02); *H02K 3/28* (2013.01); *H02K 7/108* (2013.01); *H02K 7/116* (2013.01); *H02K 9/19* (2013.01); *H02K 9/197* (2013.01); *H02K 11/33* (2016.01); *H02K 17/16* (2013.01); *H02P 25/184* (2013.01); *B60K 11/00* (2013.01); *B60K 11/02* (2013.01); *B60K 2001/006* (2013.01); *B60K 2006/4825* (2013.01); *B60K 2006/4833* (2013.01); *B60Y 2306/03* (2013.01); *H02K 1/32* (2013.01); *Y02T 10/6221* (2013.01); *Y02T 10/6252* (2013.01); *Y02T 10/641* (2013.01); *Y02T 10/70* (2013.01); *Y02T 10/7005* (2013.01); *Y02T 10/7077* (2013.01)

(58) Field of Classification Search
CPC .......... H02K 17/16; B60K 6/26; B60K 6/365; B60K 6/38; B60K 6/48; B60K 6/547; B60L 50/13; B60L 50/51; H02P 25/184
See application file for complete search history.

(56) References Cited

U.S. PATENT DOCUMENTS

| 8,653,704 | B2 | 2/2014 | Atarashi et al. |
| 9,518,622 | B2 | 12/2016 | Vogel |
| 2009/0072647 | A1 | 3/2009 | Hino et al. |
| 2009/0107270 | A1 | 4/2009 | Krieger et al. |
| 2010/0252341 | A1 | 10/2010 | Shu et al. |
| 2013/0046427 | A1 | 2/2013 | Hohenberg |

FOREIGN PATENT DOCUMENTS

| DE | 19618865 A1 | 11/1997 |
| DE | 10349558 A1 | 6/2005 |
| DE | 102006003213 A1 | 7/2007 |
| DE | 102008040495 A1 | 1/2010 |
| DE | 102010002401 A1 | 10/2010 |
| DE | 102010009832 A1 | 9/2011 |
| DE | 102011083201 A1 | 3/2013 |
| DE | 102013210451 A1 | 12/2013 |
| DE | 102013006857 A1 | 10/2014 |
| DE | 102014217269 A1 | 3/2016 |
| EP | 1049235 A2 | 11/2000 |
| EP | 2546964 A2 | 1/2013 |
| GB | 545814 A | 6/1942 |
| GB | 1450147 A | 9/1976 |
| JP | H05111215 A | 4/1993 |
| JP | H0752664 A | 2/1995 |
| JP | H1042407 A | 2/1998 |
| SI | 23465 A | 2/2012 |
| WO | 2011155277 A1 | 12/2011 |

ELECTRIC DRIVE UNIT, HYBRID DRIVE DEVICE, AND VEHICLE

The invention relates to an electric drive unit. The invention further relates to a hybrid drive device and a vehicle.

PRIOR ART

DE 103 49 558 A1 discloses a drive train for a hybrid drive system that comprises an internal combustion engine, an electric drive unit and a transmission unit. A first transmission clutch is arranged between an output shaft of the internal combustion engine and an input shaft of the transmission unit. The electric drive unit is arranged coaxially with respect to an axis of rotation of the input shaft. A plurality of known electric motors such as for example an asynchronous motor can be used as the electric drive unit. In the case of the described drive train, the constructive connection of the electric drive unit is to be simplified and the system efficiency is to be optimized. The first transmission clutch is configured as a switchable non-positive locking transmission clutch or a positive locking transmission clutch. The transmission clutch transmits a torque from the output shaft to the input shaft and vice versa. The transmission of the torque in both directions renders it possible to use the electric drive unit both as a motor as well as a generator. The electric drive unit is connected functionally directly downstream of the internal combustion engine and upstream of the transmission unit. It is possible by means of the transmission clutch to drive the transmission unit in a purely electric manner without connecting the internal combustion engine.

Furthermore, it is described as advantageous in the publication DE 103 49 558 A1 that a rotor of the electric drive unit is mounted on an intermediate shaft coaxially with respect to the input shaft in such a manner that said electric drive unit can rotate and/or be displaced in the axial direction, as a result of which the rotor or the intermediate shaft can be separated from the drive train. In the case of operation of the drive train driven purely by means of the internal combustion engine, the connection between the internal combustion engine and the transmission unit is not influenced by means of the electric drive unit. In particular, a second transmission clutch is provided between the rotor and the input shaft wherein said transmission clutch is operated in a non-positive locking manner or a positive locking manner and in particular is configured as a switchable coupling for example as a wedge coupling, claw coupling, toothed coupling or friction coupling and the electric drive unit is connected and disconnected with the aid of said coupling.

In light of increased demands on hybrid drives, the performance capability of a drive unit of the described type when using an asynchronous machine is described as unsatisfactory, the installation space is described as too large, the weight of said drive unit is described as too heavy and the power density is described as too low. In contrast, the use of a more compact and more capable synchronous machine that is excited by permanent magnets leads to high costs owing to the expensive magnetic basic materials required, in particular neodymium, dysprosium and terbium.

DISCLOSURE OF THE INVENTION

Object, Solution, Advantages

The object of the invention is to further increase the output performance and the efficiency in the case of an electric drive unit for a hybrid drive system, in particular for a vehicle, of the described type and simultaneously to reduce the thermal load on the electric drive unit. The required installation space and also the production costs are simultaneously to be minimized.

This object is achieved by means of an electric drive unit, in particular for a vehicle having an electric drive system or hybrid drive system, said electric drive unit having an output element for outputting mechanical energy that is generated in the electric drive unit, said electric drive unit comprising a combination of the following features:

the drive unit is configured with an asynchronous machine having a rotor that comprises a squirrel cage, in particular a squirrel cage that is configured with copper conductors, the asynchronous machine is configured with a stator that is fitted with a wave winding, the wave winding is configured with a device for performing a star-delta switching function, the rotor is configured with a rotor interior cooling device, a transmission gearing is arranged in a force flow between the rotor and the output element.

The asynchronous machine comprises the advantage of a simple and cost-effective rotor construction compared with a synchronous machine that is excited using permanent magnets. In particular, it is possible to use cost-effective materials that are already available. One particular advantage in the case of configuring the squirrel cage using copper conductors resides in the particularly low, specific ohmic resistance of said copper conductors, as a result of which thermal power losses that occur during operation can be clearly reduced compared with an embodiment having for example aluminum conductors and thereby the operating temperature of the asynchronous machine can be clearly reduced and thus an improved output performance and an improved efficiency can be achieved despite the increased weight of the copper conductors. Since the operating temperature remains low, fluctuations in electric current also remain low in the squirrel cage, said fluctuations being caused as a result of a temperature dependency of the specific conductivity of the material of the squirrel cage, so that stable operating conditions are achieved for the electric drive unit. Furthermore, copper comprises a higher modulus of elasticity compared with for example aluminum, in other words a greater mechanical strength. In particular in the case of high rotational speeds, any deformation of the squirrel cage as a result of centrifugal forces is consequently kept small. Altogether, smaller deformations are achieved than in the case of a synchronous machine that is excited using permanent magnets and in which it is necessary to take into account larger deformations in the case of high rotational speeds as a result of the permanent magnets that are used in slots of a rotor iron body or as a result of a weakness of the rotor iron body as a result of the slots for the permanent magnets.

The configuration of the stator having a wave winding renders it possible to reduce the size of the winding heads of the stator and to shorten the conductors with which the wave winding is formed compared with a loop coil. It is thereby possible to save conductor material and to reduce the thermal power losses that occur during operation compared with a configuration having loop coils and also to reduce weight and volume of the stator. Moreover, it is preferred that the wave winding is also configured with copper conductors. An increased efficiency, reduced installation space and reduced costs are thereby achieved.

It is particularly preferred that the wave winding is configured with profiled wires whose cross section contour is adjusted to that of the stator grooves that receive the wave winding. It is thereby possible to achieve a higher groove fill factor compared with a configuration of the wave winding having rounded wires, in other words conductors having a circular cross sectional contour. The performance capability and efficiency of the asynchronous machine is increased by means of a higher groove fill factor.

The star-delta switching function renders it possible in a simple and reliable manner to utilize in all rotational speed ranges torques that can be achieved using the asynchronous machine since the asynchronous machine in the case of low rotational speeds comprises a higher torque owing to the higher currents of said asynchronous machine in the case of the star connection than in the case of the delta connection, conversely in the case of the delta connection a higher torque is available in the case of high rotational speeds. It is preferred that according to the invention a load-dependent star-delta switching function is implemented.

In order to also be able to maintain a low operating temperature of the asynchronous machine in each case when said machine is under a high load, the rotor of the asynchronous machine in accordance with the invention is configured with a rotor interior cooling device that renders it possible to not only dissipate heat on the surface of the rotor but rather to also dissipate heat from the interior of said rotor, in other words at least near to the location where the heat occurs and thereby to significantly increase the extent to which the rotor is cooled. In particular, the rotor is provided for this purpose with cooling medium ducts through which it is possible for a cooling medium to be guided and through which a cooling medium is guided during operation. It is particularly preferred that the rotor interior cooling device is configured so as to cooperate with, where appropriate, further cooling devices of the electric drive unit. In particular, when used in a vehicle having an electric drive or hybrid drive system, the rotor interior cooling system is advantageously configured so as to cooperate with or be combined with cooling devices of further elements and/or assemblies of the electric drive system or hybrid drive system.

The transmission gearing from the rotor to the output element of the electric drive unit is used to translate the rotational speed of the rotor to the rotational speed of the output element. The rotor of the asynchronous machine is thereby operated with a higher rotational speed than the output element. This configuration is particularly advantageous, if the output element is to be coupled or can be coupled directly to for example an internal combustion engine, in other words in particular to the crankshaft of said internal combustion engine, in the case of use of the electric drive unit in accordance with the invention in a hybrid drive system. The output element of the electric drive unit in accordance with the invention then comprises during operation the same rotational speed as the crankshaft. In order to operate an internal combustion engine with as high an efficiency as possible and above all to consume as little fuel as possible, a rather lower rotational speed is preferred for the crankshaft. In contrast, the asynchronous machine is most efficient in its upper rotational speed range, in other words in the case of high rotational speeds. In contrast to a synchronous machine that is excited using permanent magnets, said machine being most efficient at low rotational speeds, the asynchronous machine is preferably to be operated at high rotational speeds, and in fact optimally at rotational speeds that are higher than the rotational speeds at which the internal combustion engine is highly efficient and consumes the least amount of fuel. The rotational speeds of the rotor and of the output element are advantageously adjusted to one another by means of the transmission gearing in such a manner that in the case of the mentioned use of the electric drive unit in accordance with the invention in a hybrid drive system both the asynchronous machine as well as the internal combustion engine can function in their respective optimal rotational speed ranges and thus a particularly effective drive system is achieved. Simultaneously, it is thereby achieved that also in the case of a purely electric operating mode of a hybrid drive system of this type, in other words in the case of a disconnected and/or uncoupled internal combustion engine and driving the exemplary mentioned vehicle only using the electric drive unit, the asynchronous machine functions in the optimal rotational speed range, in other words is as efficient as possible. This increases the utilization of energy and reduces thermal power losses and loads.

The combination in accordance with the invention of the above-described features renders it possible to achieve an efficient electric drive unit in an as small as possible installation space. It is no longer required when using the invention for reasons of limiting the installation space that is available for the electric drive unit to prefer synchronous machines that are excited using permanent magnets compared with asynchronous machines in an electric drive system of this type and in particular in hybrid drive systems that are configured with said electric drive system. The combination in accordance with the invention of the individually illustrated features renders it possible to achieve a high power density and efficiency so that the illustrated asynchronous machine can also be provided for use in hybrid vehicles.

Advantageous embodiments of the invention are characterized in the dependent claims.

In accordance with a preferred further development of the electric drive unit in accordance with the invention the transmission gearing is configured with a planetary gear. A configuration having a planetary gear renders possible in particular a compact, coaxial arrangement of the transmission gearing both with the rotor as well as the output element of the electric drive unit in accordance with the invention. As a consequence, an installation space that is available to the electric drive unit in accordance with the invention is particularly well utilized. In particular, the transmission gearing can be incorporated into the electric drive unit in accordance with the invention without having to increase the dimensions of said drive unit. Also, any increase in weight of the electric drive unit in accordance with the invention as a result of adding the transmission gearing is thereby strictly limited.

In the case of a further preferred embodiment of the electric drive unit in accordance with the invention, the planetary gear is configured for a dual-shaft operation having an epicyclic transmission, wherein the planetary gear comprises a transmission ratio of in particular 1:1.5 to 1:2. A planetary gear, in general also known as an epicyclic gear, comprises in a simple form two central wheels of which one is preferably configured as a ring gear and the other as a sun wheel and also at least one planet gear. The rotation path of the at least one planet gear occurs coaxially with respect to the two central wheels. Each planet gear performs a full rotation about its planet carrier, and the at least one planet carrier rotates coaxially with respect to the two central wheels. In the dual-shaft operation, the planetary gear is constrained in motion, in other words its degree of rotation is equal to one. This means that when driving a shaft of the planetary gear, the rotation of the second shaft is distinct. The dual-shaft operation is achieved by virtue of the fact that one of the central wheels with its shaft or the at least one planet carrier remains stationary. In the case of the epicyclic transmission that forms one possible form of the dual-shaft operation, one of the central wheels remains stationary with its shaft. The drive and output occurs by way of the other of the central wheels that is rotating with its shaft and by way of the at least one planet carrier. It is particularly preferred that in the case of the present invention the sun wheel is fixed, the ring gear is connected to the rotor in such a manner that said ring gear can rotate and the at least one planet carrier is connected to the output element of the electric drive unit. In this manner, in a particularly simple and compact manner by means of accordingly selecting the circumferences of the sun wheel and the ring gear, a preferred desired transmission ratio of the rotational speed of the output element to the rotational speed of the rotor of in particular 1:1.5 to 1:2 is achieved.

In an advantageous further development of the electric drive unit in accordance with the invention, the transmission gearing is arranged in and/or near to a cooling medium and/or lubricant chamber for at least the rotor. It is preferred that this cooling medium and/or lubricant chamber is an oil chamber. It is thereby rendered possible in a particularly simple manner to lubricate and/or cool the transmission gearing without it being necessary to provide a complex cooling medium supply and/or lubricant supply or even a separate cooling device and/or lubricating device for the transmission gearing. The transmission gearing can thus be incorporated with little outlay into a cooling and/or lubrication system of the electric drive unit and where appropriate further assemblies of a hybrid drive device in which the electric drive unit is used, such as in particular couplings so as to couple the electric drive unit in accordance with the invention to an internal combustion engine and/or a transmission, in particular a manually-shifted transmission, particularly preferably an automatic gear-shift.

According to another embodiment of the electric drive unit in accordance with the invention, the rotor comprises a rotor carrier having a supporting region that essentially extends in the axial direction and in the circumferential direction of the rotor and an arrangement of magnetic regions that is arranged on the supporting region and is configured with a laminated stack and the squirrel cage, wherein the rotor comprises at least one cooling medium duct that is encompassed by the rotor interior cooling device and is at least in part provided and/or arranged between the arrangement of magnetic regions and the rotor carrier. It should be noted that an electric machine having a rotor interior cooling device is described in the German patent application DE 10 2013 006 857.6, in accordance with which the rotor interior cooling device of the electric drive unit in accordance with the invention is preferably configured and by means of which the non-uniform cooling of the arrangement of magnetic regions of the rotor is reduced. Moreover, it is to be noted that the configuration of the laminated stack and squirrel cage does not represent an arrangement of magnetic regions in the strictest sense since said arrangement is not configured with magnets, in particular not with permanent magnets. For the sake of simplicity and because also currents are induced in the configuration of the laminated stack and squirrel cage, said currents occurring in magnetic interaction with a magnetic field that is generated by the stator, said configuration of the laminated stack and squirrel cage is hereinunder, also described as an arrangement of magnetic regions within the scope of the description of the exemplary embodiments.

In the case of a preferred further development of the electric drive unit in accordance with the invention, at least the at least one cooling medium duct of the rotor interior cooling device is configured in such a manner that a cooling medium and/or lubricant that is intended for cooling and/or lubricating at least one rotor can flow through said cooling medium duct. It is preferred that the at least one cooling medium duct is configured in such a manner that a cooling medium and/or a lubricating oil, particularly preferably a transmission oil and/or bearing oil, can flow through said cooling medium duct for cooling and/or lubricating preferably the transmission gearing, a rotor bearing in particular of a rotor carrier in preferably a bearing housing and/or a transmission and/or drive housing. Further assemblies that are connected to the electric drive unit in a hybrid drive device, said assemblies being for example clutches or transmissions, can be configured in such a manner that the same cooling medium and/or lubricant, preferably cooling oil and/or lubricating oil, can flow through said assemblies, in other words said assemblies can be combined in a common cooling medium circuit and/or lubricant circuit.

According to another preferred embodiment of the electric drive unit in accordance with the invention, so as to form the device for performing the star-delta switching function, the asynchronous machine forms an open multiphase system that comprises a predetermined number of phases and open windings and a circuit arrangement is provided for supplying the asynchronous machine with a multiphase voltage that comprises the predetermined number of phases from an energy source that is essentially configured so as to deliver a first direct current voltage, said circuit arrangement comprising a first inverter stage for supplying a number of first connectors of the asynchronous machine, said number corresponding to the predetermined number of phases, from the energy source, and a second inverter stage for supplying a number of second connectors of the asynchronous machine, said number corresponding to the predetermined number of phases, from the energy source by way of at least one switching element so as to selectively obtain the second direct current voltage from the first direct current voltage of the energy source and so as to deliver this second direct current voltage that is obtained from the first direct current voltage of the energy source to the second inverter stage, wherein the first inverter stage and the second inverter stage are configured so as to supply power to the asynchronous machine to selectively connect the first and second connectors of the asynchronous machine to form a star connection or a delta connection. It is preferred that a star-delta switching function of this type is configured in accordance with the German patent application DE 10 2014 217 269.1 with the application date 29 Aug. 2014. In accordance with the present invention, the wave winding of the stator that is connected to the device for the star-delta switching function is configured with open windings whose connectors form the first and second connectors of the asynchronous machine. Advantageously, the energy source is configured with at least one rechargeable battery, preferably a traction battery of a vehicle, and/or at least one fuel cell and/or at least one capacitor, in particular with at least one so-called supercapacitor.

The above mentioned object is furthermore achieved by means of a hybrid drive device that is characterized by means of at least one electric drive unit of the above-described type, by means of at least one internal combustion engine and by means of at least one clutch device for selectively connecting and/or disconnecting a force flow between the internal combustion engine and the output element of the at least one electric drive unit. The force flow can be directed both from the internal combustion engine to the output element as well as from the output element to the internal combustion engine so that the hybrid drive device in accordance with the invention can be used both in a motor operation of the electric drive unit preferably for traction, but also for a starter function for the internal combustion engine, as well as in a generator operation in which the electric drive unit is used as a generator, in particular to charge a traction battery or another energy storage device. The traction can occur together with the internal combustion engine or however alone by means of the electric drive unit in the case of an uncoupled internal combustion engine. The hybrid drive device can also advantageously comprise multiple electric drive units that each comprise a separate or at least in part a common output element. A hybrid drive device of this type is constructed in a simple and compact manner and is particularly efficient during operation.

The above-mentioned object is moreover achieved by means of a vehicle that comprises an electric drive unit of the above-described type and/or a hybrid drive device of the above-described type. A vehicle that is configured in this manner is fitted in a simple manner with a compact, high-performance and cost-effective drive system.

SHORT DESCRIPTION OF THE DRAWINGS

Figure 2:
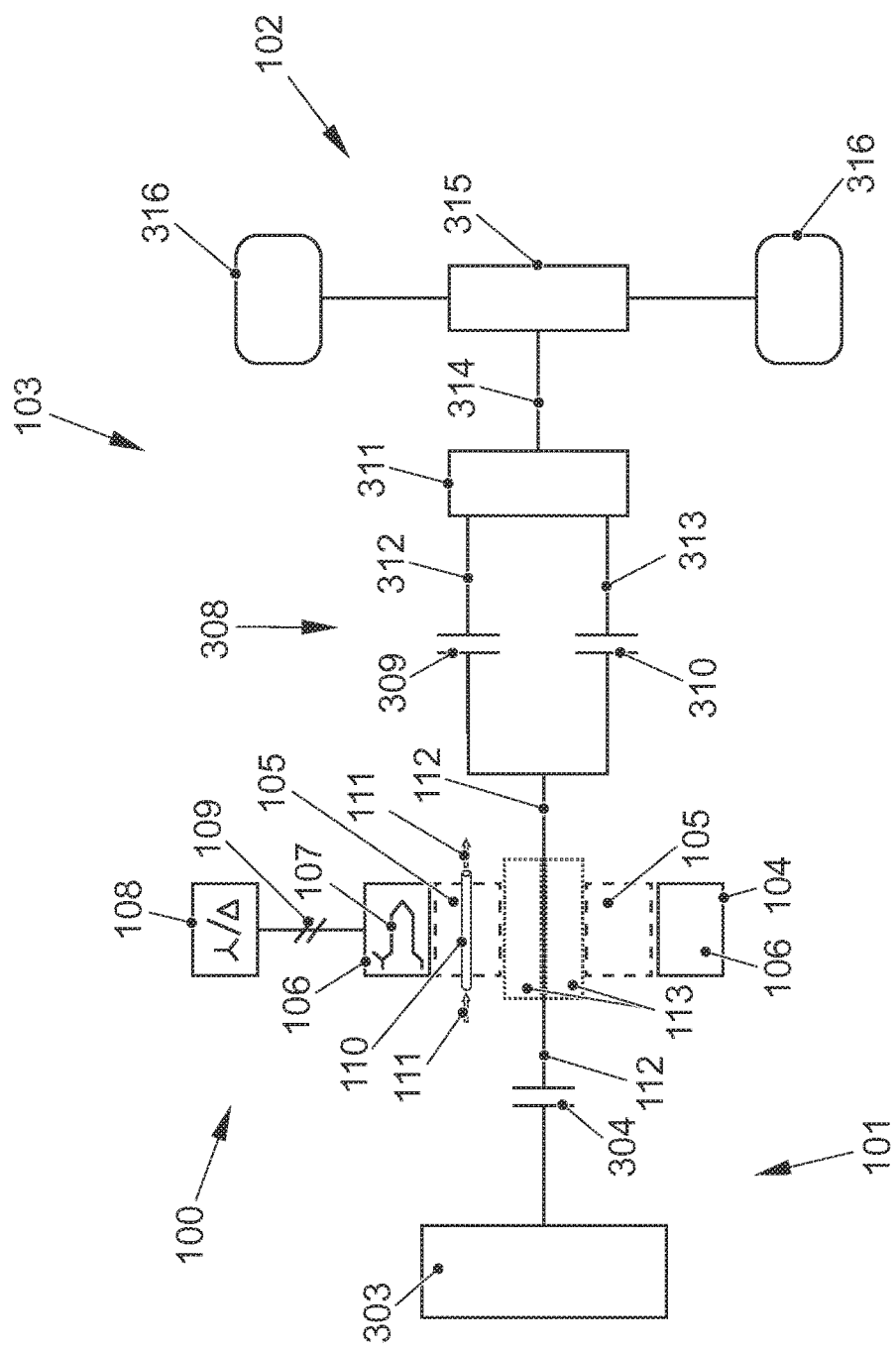
Figure 3:
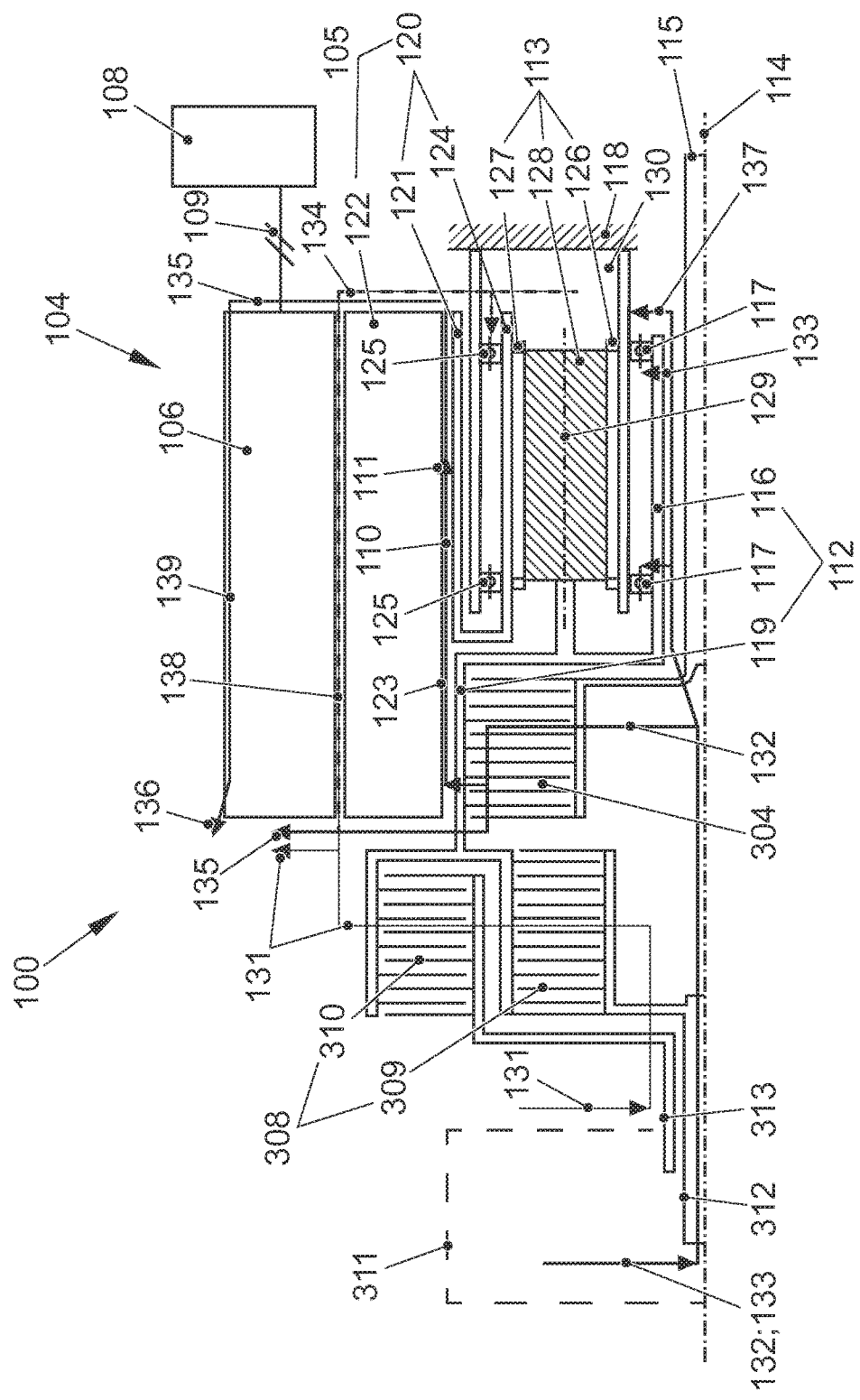
Figure 4:
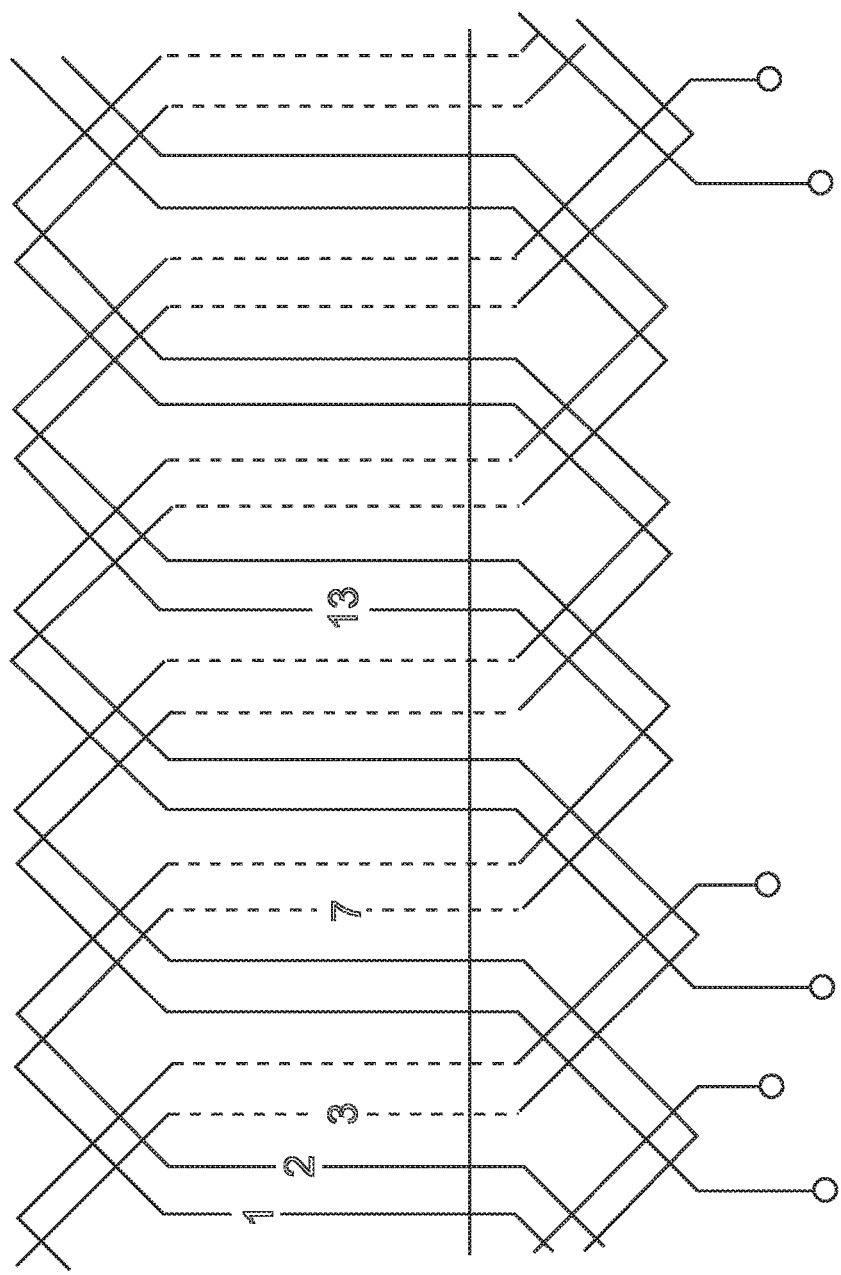
Figure 5:
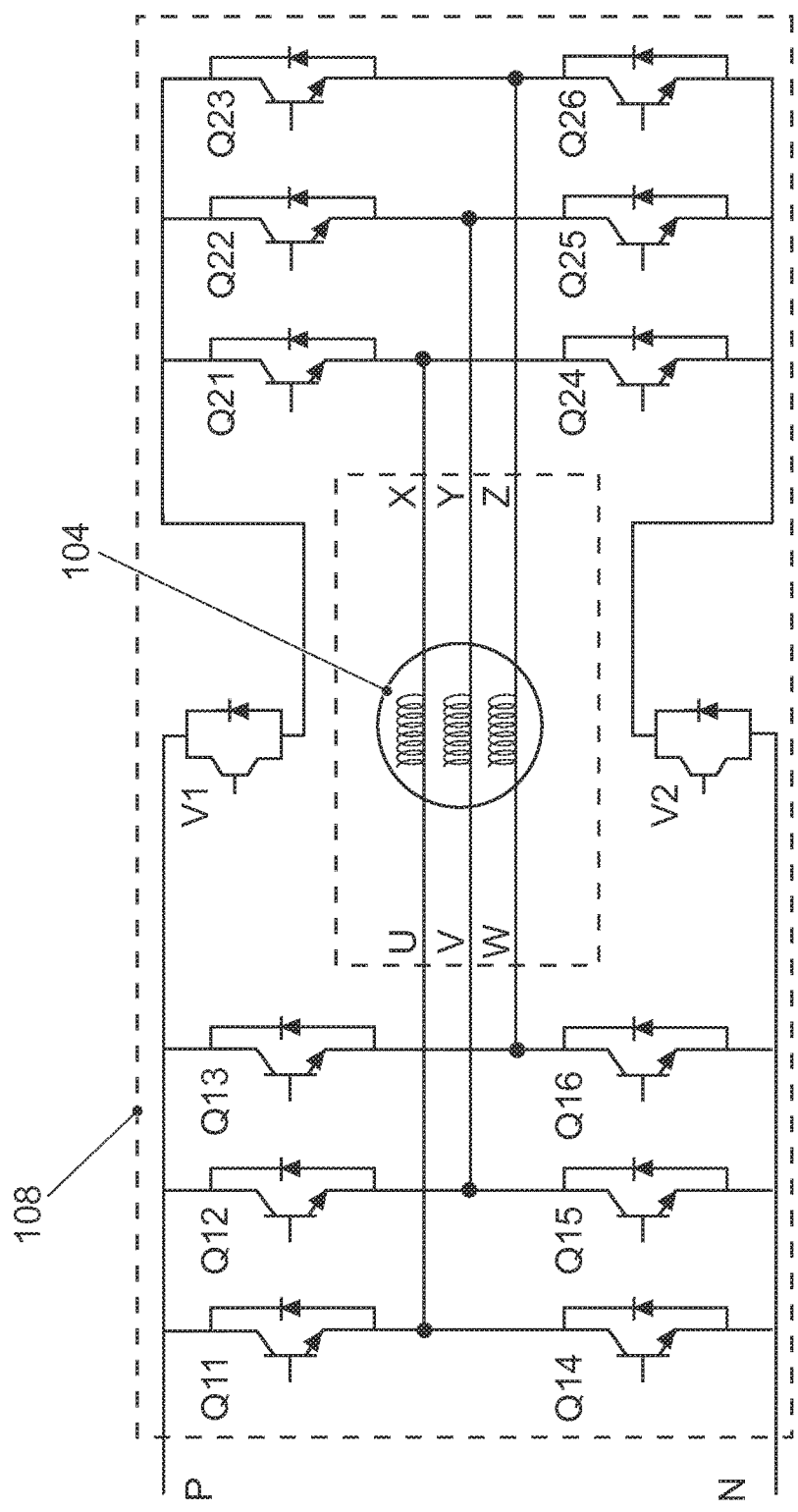

In the drawing, corresponding elements in all figures are provided with identical reference numerals and a repeated description of these elements is omitted. In the drawing:

FIG. 1 illustrates a simplified schematic view of a drive train of a motor vehicle having a hybrid drive device that is fitted with an electric drive unit, as is used in the prior art, FIG. 2 illustrates a simplified schematic view of an exemplary embodiment of a drive train of a motor vehicle having a hybrid drive device that is fitted with an electric drive unit in accordance with the invention, FIG. 3 illustrates a simplified schematic view of one half of a longitudinal section through an electric drive unit in accordance with the invention and used in a drive train of a motor vehicle having a hybrid drive device, FIG. 4 illustrates a simplified schematic view of a winding schema for an example of a wave winding, and FIG. 5 illustrates a simplified schematic circuit diagram of an example of a device for performing the star-delta switching function, as said device is used in an exemplary embodiment of the electric drive unit in accordance with the invention.

The configurations that are illustrated in the drawing are further described hereinunder and in particular of said configurations the exemplary embodiments of the invention are described.

PREFERRED EMBODIMENT OF THE INVENTION

FIG. 1 illustrates a simplified schematic view of a drive train of a motor vehicle having a hybrid drive device 301 and said drive train is referred to with the reference numeral 300. The drive train 300 comprises the hybrid drive device 301 that is fitted with an electric drive unit 302, as is used in the prior art. Furthermore, the hybrid drive device 301 comprises an internal combustion engine 303 and a first clutch device 304 that is used to selectively connect and/or disconnect a force flow between the internal combustion engine 303 and an output element 305 of the electric drive unit 302. The electric drive unit 302 is configured with a stator 306 and a rotor 307. The rotor 307 is in particular configured with an arrangement of magnetic regions that is however not illustrated in detail in FIG. 1, said arrangement of magnetic regions having at least one permanent magnet and being connected in a non-positive locking manner to the output element 305. In particular, the output element 305 is formed with a rotor shaft of the rotor 307. The force flow can be guided from the output element 305 to a double clutch transmission 311 by way of a double clutch 308 that comprises a second clutch device 309 and a third clutch device 310, and in fact in particular said force flow can be guided by way of the second clutch device 309 to a first input shaft 312 of the double clutch transmission 311 and by way of the third clutch device 310 to a second input shaft 313 of the double clutch transmission 311. The force flow can be further guided from an output shaft 314 of the double clutch transmission 311 by way of a differential transmission 315 to drive wheels 316 of the motor vehicle.

FIG. 2 illustrates, based on the configuration according to FIG. 1, in a simplified schematic manner an exemplary embodiment of a drive train 103 of a motor vehicle 102 having a hybrid drive device 101 that is fitted with an exemplary embodiment of an electric drive unit 100 in accordance with the invention. The electric drive unit 100 is configured with an asynchronous machine 104 that is indicated in a symbolic longitudinal illustration, said asynchronous machine having a rotor 105 that comprises a squirrel cage that is in particular configured with copper conductors. Moreover, this asynchronous machine 104 comprises a stator 106 that is configured with a wave winding 107 having in particular open windings, in other words open winding ends. The asynchronous machine 104 consequently represents an open multiphase system that comprises a predetermined number of phases, said multiphase system having open windings. The two winding ends of each of the windings or winding strings for each phase of the asynchronous machine 104 can be supplied independently of one another by way of a multi-conductor cable 109 by means of a circuit arrangement 108 for supplying the asynchronous machine 104 from an energy source (not illustrated) that is essentially configured so as to deliver a first direct current, and the number of wires of said multi-conductor cable corresponds to the total number of winding ends of the wave winding 107. It is also possible using the circuit arrangement 108 during operation to implement a star-delta switching function of the wave winding 107 of the asynchronous machine 104.

The rotor 105 of the asynchronous machine 104 is configured with a rotor interior cooling device 109 that is indicated in FIG. 2 symbolically by means of a cooling medium duct that is tube-shaped and is encompassed in the rotor interior cooling device 109. It is possible for a cooling medium to be guided through the cooling medium duct, arrow 110 symbolizes this cooling medium flow. Thermal energy that occurs during operation of the asynchronous machine 104 is dissipated by the rotor cooling device 109 from the interior of the rotor 105.

The electric drive unit 100 of the hybrid drive device 101 comprises an output element 112 that can be coupled by way of the first clutch device 304 to the internal combustion engine 303 so as to selectively connect and/or disconnect a force flow between the internal combustion engine 303 and the output element 112. The force flow can be guided from the output element 112 back to the double clutch transmission 311 by way of the double clutch 308 having the second clutch device 309 and the third clutch device 310, and in fact as in the case of the configuration according to FIG. 1 in particular selectively by way of the second clutch device 309 to the first input shaft 312 of the double clutch transmission 311 and by way of the third clutch device 310 to the second input shaft 313 of the double clutch transmission 311. In contrast to the configuration according to FIG. 1 in the case of the arrangement according to FIG. 2 however a transmission gearing 113 is arranged in a force flow between the rotor 105 and the output element 112, said transmission gearing being indicated symbolically in FIG. 2. The transmission gearing 113 is advantageously configured and arranged coaxially with respect to the rotor 105 and the output element 112. It is preferred that the transmission gearing 113 is configured as a planetary gear for a dual-shaft operation having an epicyclic transmission, wherein the planetary gear comprises a transmission ratio of in particular 1:1.5 to 1:2 by which transmission ratio the rotational speed of the rotor 105 is higher than the rotational speed of the output element 112 and thereby both the internal combustion engine as well as the first and the second input shaft 312, 313.

FIG. 3 illustrates a simplified schematic view of a half of a longitudinal section, said half being created along an axis of rotation 114, through the exemplary embodiment of the electric drive unit 100 in accordance with the invention according to FIG. 2, used in the drive train 103 of the motor vehicle 102 having the hybrid drive device 101. An example for more precise details of a spatial arrangement of the individual construction elements or assemblies of the electric drive unit 100 are indicated in a simplified schematic manner. An input hub 115 that can rotate about the axis of rotation is on the one hand connected in a non-positive locking manner to the internal combustion engine 303 that is not illustrated in FIG. 3 for simplicity, in particular the crankshaft of said internal combustion engine, and on the other hand is connected in a non-positive locking manner to an inner multiplate set of the first clutch device 304 that is configured with a multiplate clutch. The output element 112 is configured with a hollow shaft-type bearing region 116 and is mounted in bearings 117 in a drive housing 118 so as to be able to rotate about the axis of rotation 114. Moreover, the output element 112 is configured with a clutch supporting region 119 in which said output element is connected in a non-positive locking manner to each outer multiplate set of each of the first 304, the second 309 and the third 310 clutch device. An inner multiplate set of the second clutch device 309 is connected in a non-positive locking manner to the first input shaft 312, and an inner multiplate set of the third clutch device 310 is connected in a non-positive locking manner to the second input shaft 313 that comprises the first input shaft 312 in a hollow shaft manner, wherein both the first input shaft 312 as well as also the second input shaft 313 are arranged so as to be able to rotate about the axis of rotation 114.

The rotor 105 of the asynchronous machine 104 comprises a rotor carrier 120 having a supporting region 121 that extends essentially in the axial and circumferential direction of the rotor 105, and said rotor comprises an arrangement of magnetic regions 122 that is arranged on the supporting region 121 and is configured with a laminated stack and the squirrel cage. The rotor 105 furthermore comprises at least one cooling medium duct 123 that is at least in part provided and/or configured between the arrangement of magnetic regions 122 and the rotor carrier 120, said cooling medium duct being encompassed by the rotor cooling device 110. In particular, the at least one cooling medium duct 123 is arranged along a delimiting surface, along which the arrangement of magnetic regions 122 sits on the supporting region 121 at least in part in a non-positive locking and positive locking manner. It is preferred that the arrangement of magnetic regions 122 is configured as a hollow-cylindrical shape and is mounted by means of for example interference fit on the delimiting surface that forms a cylindrical surface of the supporting region 121, said surface being coaxial with respect to the axis of rotation 114. The at least one cooling medium duct 123 is then formed by means of recesses that are formed in an axial and/or tangential and/or helical manner along the delimiting surface in the supporting region 121 and/or the arrangement of magnetic regions 122. FIG. 3 illustrates in a symbolic manner a cooling medium duct 123 that is aligned axially along the delimiting surface. Moreover, the rotor carrier 120 comprises a bearing region 124 that is configured as coaxial with respect to the axis of rotation 114 and said rotor carrier is mounted in said bearing region by way of a bearing 125 in the drive housing 118 so as to be able to rotate about the axis of rotation 114.

The transmission gearing 113 is arranged in the force flow between the rotor carrier 120 and the output element 112 of the electric drive unit 100. In addition thereto, a sun wheel 126 that is provided with outer teething is connected coaxially with respect to the axis of rotation 114 in a non-positive locking manner to the drive housing 118 and is fixed to said drive housing. A ring gear 127 of the transmission gearing 113 is connected in a non-positive locking manner to the bearing region 124 of the rotor carrier 120 and consequently can rotate together with the rotor carrier 120 about an axis of rotation 114. The ring gear 127 consequently rotates with the rotor 105. At least one planet gear 128 of the transmission gearing 113 is in engagement with both the sun wheel 126 as well as with the ring gear 127. The at least one planet gear 128 is mounted on the output element 112 in such a manner that said planet gear can rotate about a respective planet gear axis 129 in such a manner that said planet gear can rotate with the output element 112 about the axis of rotation 114. It is possible by means of this arrangement to achieve a transmission ratio between the rotational speeds of the rotor 105 and output element 112 in which case the rotor rotates more rapidly than the output element. It is preferred that the sun wheel 126 and ring gear 127 are dimensioned in such a manner that a transmission ratio of 1:1.5 to 1:1.2 is produced.

The transmission gearing 113 is arranged in accordance with FIG. 3 in the interior of the rotor carrier 120 in a cooling medium and/or lubricant chamber that is provided at that location, in particular an oil chamber 130, of the hybrid drive device 101. The cooling medium and/or lubricant chamber, in particular oil chamber 130, is configured so as to receive an intended supply of cooling medium and/or lubricant, in particular an oil. Cooling medium and/or lubricant ducts are arranged starting from the cooling medium and/or lubricant chamber, in particular oil chamber 130 and the cooling medium and/or lubricant, in particular oil, is conveyed in said ducts from the cooling medium and/or lubricant chamber, in particular oil chamber 130, into a single or multi-circuit cooling medium and/or lubricant circulation, in particular an oil circulation. This cooling medium and/or lubricant circulation, in particular oil circulation, is symbolically indicated in FIG. 3 by means of arrows; the cooling medium flow 111 in the at least one cooling medium duct 123 of the rotor interior cooling device 110 is also associated with said cooling medium and/or lubricant circulation. In detail, the arrows 131 describe a cooling medium and/or lubricant circulation, in particular oil circulation, for cooling and/or lubricating the double clutch 308 having the second clutch device 309 and the third clutch device 310, the arrows 132 describe a cooling medium and/or a lubricant circulation, in particular oil circulation, for cooling and/or lubricating the first clutch device 304, the arrows 133 describe a cooling medium and/or lubricant circulation, in particular oil circulation, for cooling and/or lubricating the bearing 117, the arrows 134 describe a cooling medium and/or lubricant circulation, in particular oil circulation, for cooling and/or lubricating the bearing 125 and also for cooling an air gap 138 between the rotor 105 and stator 106 of the asynchronous machine 104, the arrows 135 describe a cooling medium and/or lubricant circulation, in particular oil circulation, for cooling winding heads of the wave winding 107 of the stator 106 and the arrows 136 describe a cooling medium and/or lubricant circulation, in particular oil circulation, for cooling the stator 106 by way of cooling medium grooves and/or lubricant grooves 139 on the stator outer periphery. In particular, at least one part current of the cooling medium and/or lubricant circulation, in particular oil circulation 132, is guided through the first clutch device 304 as a cooling medium flow 111 into the at least one cooling medium duct 123 of the rotor interior cooling device 110. The transmission gearing 113 is cooled and/or lubricated directly from the cooling medium and/or lubricant chamber, in particular oil chamber, 130. The arrow 137 symbolizes a cooling medium return flow and/or lubricant return flow, in particular oil return flow, to the cooling medium and/or lubricant chamber, in particular oil chamber, 130. It is preferred in particular that the first input shaft 312 for the cooling medium and/or lubricant circulation, in particular oil circulating system, 132 and 133 is configured with a hole in the manner of a hollow shaft.

It is also possible using the above-mentioned cooling medium and/or lubricant circulations in the case of a high power density in the described hybrid drive device to keep the thermal load on the individual elements and/or assemblies low. By way of example, a so-called ATF—"automatic transmission fluid"—that can withstand temperatures up to a maximum 150° C. is used as a cooling medium or lubricant. The result of this is that when operating a hybrid drive device that is configured in accordance with the invention a cooling medium temperature and/or lubricant temperature of approximately 90° C. can be maintained, in other words not exceeded, depending on operating conditions for in particular the rotor 105 and the clutch devices 304, 309, 310. A particularly effective cooling procedure is achieved, in particular of the rotor 105 that without the described measures for cooling would have developed much higher temperatures. A reliable and stable and safe operation is thereby ensured by means of the invention.

FIG. 5 illustrates a simplified schematic circuit diagram of an example for the circuit arrangement 108 for supplying the asynchronous machine 104 having a device for performing the star-delta switching function as said device is used in the above-described exemplary embodiment of the electric drive unit 100 in accordance with the invention. In addition thereto, FIG. 4 illustrates a simplified schematic illustration of a section of a winding arrangement that is configured in a known manner for an example of a wave winding to clarify a possible construction of the wave winding 107. A winding arrangement of this type is for example known from the monograph of Müller/Ponick: "Berechnung Elektrischer Maschinen" [Commutation of electric machines]. The conductors of the wave winding are always guided in the circumferential direction of the rotor from a stator groove to a next stator groove without returning as in the case of a loop winding, as a result of which in particular particularly space-saving winding heads can be achieved. In the case of the wave winding according to FIG. 4, the stator grooves are numbered through 1, 2, 3, . . . and for example a conductor is placed one after the other in a first, seventh, thirteenth etc. stator groove.

The circuit arrangement 108 is configured so as to supply power to the asynchronous machine 104 and is configured as a device for performing the star-delta switching function of the asynchronous machine 104. The asynchronous machine 104 forms an open multiphase system that comprises a predetermined number of phases, in particular a three-phase system. In accordance with the present invention, the wave winding 107 of the stator 106 that is connected to the device for performing the star-delta switching function is configured with open windings whose connectors form the first U, V, W and second X, Y, Z connectors of the asynchronous machine 104. In FIGS. 2 and 3, the first U, V, W and second X, Y, Z connectors of the asynchronous machine 104 are combined to form the multi-conductor cable 109. An energy source (not illustrated) that is essentially configured so as to deliver a first direct current voltage is preferably formed by means of a traction battery of a vehicle, a fuel cell or the like and can be connected using connectors P and N. The circuit arrangement 108 generates from the first direct current voltage a multiphase voltage that comprises the predetermined number of phases and supplies with said multiphase voltage the asynchronous machine 104 at its first U, V, W and second X, Y, Z connectors. For this purpose, the circuit arrangement 108 comprises a first inverter stage of semiconductor switches Q11, Q12, Q13, Q14, Q15, Q16, in this case transistors having non-return diodes, for supplying from the energy source the number of the first connectors U, V, W of the asynchronous machine 104, said number of phases corresponding to the predetermined number of phases, in this case the number of phases is 3. Moreover, a second inverter stage of semiconductor switches Q21, Q22, Q23, Q24, Q25, Q26, likewise in this case transistors having non-return diodes, is provided to supply the number of second connectors X, Y, Z of the asynchronous machine 104 with a second direct current, said number of second connectors X, Y, Z corresponding to the predetermined number of phases. This second direct current can be obtained from a second, independent energy source. However, it is preferred that in the exemplary embodiment according to FIG. 5 two switching elements V1, V2 are provided so as to selectively obtain the second direct current voltage from the first direct current voltage of the energy source at the connectors P, N and to deliver said second direct current voltage that is obtained from the first direct current voltage of the energy source to the second inverter stage Q21, Q22, Q23, Q24, Q25, Q26. The first inverter stage Q11, Q12, Q13, Q14, Q15, Q16 and the second inverter stage Q21, Q22, Q23, Q24, Q25, Q26 are configured so as to selectively connect the first U, V, W and the second X, Y, Z connectors of the asynchronous machine 104 to form a star connection or a delta connection for the purpose of supplying the asynchronous machine 104.

The invention renders possible the construction of a compact and high-performance hybrid drive device 101 that owing to its compact construction can be used in a particularly flexible manner. In particular, a longitudinal or transverse installation position is possible in a vehicle 102, in other words with a position of the axis of rotation 114 in a longitudinal or a transverse direction of the vehicle 102 without the associated installation space limitations for the hybrid drive device 101 causing noticeable limitations in the performance capability of the hybrid drive device 101.

LIST OF REFERENCE NUMERALS

100 Electric drive unit
101 Hybrid drive device
102 Motor vehicle
103 Drive train
104 Asynchronous machine
105 Rotor of 104
106 Stator of 104
107 Wave winding of 104
108 Circuit arrangement for supplying power to 104
109 Multi-conductor cable for supplying power to 107 from 108
110 Rotor interior cooling device
111 Arrows, symbolizing cooling medium flow in 110
112 Output element of 100
113 Transmission gearing
114 Axis of rotation
115 Input hub
116 Bearing region of 112
117 Bearing
118 Drive housing
119 Clutch supporting region of 112
120 Rotor carrier of 105
121 Supporting region of 120
122 Arrangement of magnetic regions of 105
123 Cooling medium duct
124 Bearing region of 120
125 Bearing
126 Sun wheel of 113
127 Ring gear of 113
128 Planet gear of 113
129 Planet gear axis of 113
130 Cooling medium and/or lubricant chamber, in particular oil chamber
131 Arrows: cooling medium and/or lubricant circulation, in particular oil circulation, for 308
132 Arrows: cooling medium and/or lubricant circulation, in particular oil circulation, for 304
133 Arrows: medium and/or lubricant circulation, in particular oil circulation, for 117
134 Arrows: cooling medium and/or lubricant circulation, in particular oil circulation, for 125, 138
135 Arrows: cooling medium and/or lubricant circulation, in particular oil circulation, for winding heads of 107
136 Arrows: cooling medium and/or lubricant circulation, in particular oil circulation, for 139 of 106
137 Arrow: cooling medium return flow and/or lubricant return flow, in particular oil return flow, to 130
138 Air gap
139 Cooling medium grooves and/or lubricant grooves of 106
300 Drive train
301 Hybrid drive device
302 Electric drive unit (prior art)
303 Internal combustion engine
304 First clutch device
305 Output element of 302
306 Stator of 302
307 Rotor of 302
308 Double clutch
309 Second clutch device of 308
310 Third clutch device of 308
311 Double clutch transmission
312 First input shaft
313 Second input shaft
314 Output shaft
315 Differential transmission
316 Drive wheels
N Connector of 108
P Connector of 108
Q11 Semiconductor switch of the first inverter stage
Q12 Semiconductor switch of the first inverter stage
Q13 Semiconductor switch of the first inverter stage
Q14 Semiconductor switch of the first inverter stage
Q15 Semiconductor switch of the first inverter stage
Q16 Semiconductor switch of the first inverter stage
Q21 Semiconductor switch of the second inverter stage
Q22 Semiconductor switch of the second inverter stage
Q23 Semiconductor switch of the second inverter stage
Q24 Semiconductor switch of the second inverter stage
Q25 Semiconductor switch of the second inverter stage
Q26 Semiconductor switch of the second inverter stage
V1 Switching element
V2 Switching element
U First connector of 104
V First connector of 104
W First connector of 104
X Second connector of 104
Y Second connector of 104
Z Second connector of 104

The invention claimed is:

1. An electric drive unit, comprising:
an output element for outputting mechanical energy that is generated in the electric drive unit;
an asynchronous machine having a rotor formed with a squirrel cage and having a stator fitted with a wave winding;
said wave winding being configured with a device for performing a star-delta switching function;
said rotor having a rotor interior cooling device; and
a transmission gearing arranged in a force flow between said rotor and said output element.

2. The electric drive unit according to claim 1, wherein said squirrel cage is configured with copper conductors.

3. The electric drive unit according to claim 1, configured for a vehicle having an electric drive system or a hybrid drive system.

4. The electric drive unit according to claim 1, wherein said transmission gearing comprises a planetary gear.

5. The electric drive unit according to claim 4, wherein said planetary gear is configured for a dual-shaft operation with an epicyclic transmission.

6. The electric drive unit according to claim 5, wherein said planetary gear has a transmission ratio between 1:1.5 and 1:2.

7. The electric drive unit according to claim 1, which comprises a cooling medium and/or lubricant chamber for said rotor, and wherein said transmission gearing is disposed in or in close vicinity to said cooling medium and/or lubricant chamber.

8. The electric drive unit according to claim 1, wherein said rotor comprises:
a rotor carrier having a supporting region that extends substantially in an axial and circumferential direction of said rotor;
an arrangement of magnetic regions disposed on said supporting region and configured with a laminated stack and said squirrel cage; and at least one cooling medium duct between said arrangement of magnetic regions and said rotor carrier and encompassed by said rotor interior cooling device.

9. The electric drive unit according to claim 8, wherein said at least one cooling medium duct of said rotor interior cooling device is configured to conduct a flow of a cooling medium and/or a lubricant for cooling and/or lubricating at least said rotor.

10. The electric drive unit according to claim 1, wherein said device for implementing the star-delta switching function comprises:
- an open multiphase system of said asynchronous machine formed with a predetermined number of phases and open windings;
- said asynchronous machine having a given number of first connectors and a given number second connectors, wherein the given number is equal to the predetermined number of phases of said asynchronous machine;
- a circuit arrangement for supplying said asynchronous machine with a multiphase voltage, said circuit arrangement having the predetermined number of phases from an energy source that is configured to deliver a first direct current voltage;
- said circuit arrangement having a first inverter stage for supplying said first connectors of said asynchronous machine from said energy source and a second inverter stage for supplying said second connectors of said asynchronous machine from said energy source by way of at least one switching element so as to selectively obtain a second direct current voltage from the first direct current voltage of said energy source and to deliver the second direct current voltage to said second inverter stage; and
- wherein said first inverter stage and said second inverter stage are configured to selectively connect said first and second connectors of said asynchronous machine to form a star connection or a delta connection so as to supply power to said asynchronous machine.

11. A hybrid drive device, comprising:
- at least one electric drive unit according to claim 1;
- at least one internal combustion engine; and
- at least one clutch device for selectively connecting and disconnecting a force flow between said internal combustion engine and said output element of said at least one electric drive unit.

12. A vehicle, comprising an electric drive unit according to claim 1.

13. The vehicle according to claim 12, which further comprises an internal combustion engine and a clutch device for selectively connecting and disconnecting a force flow between said internal combustion engine and said output element of said electric drive unit.

* * * * *